March 25, 1969  AKIRA MIZUNO  3,434,575
MOTOR CONTROL AND BRAKE HOLDER
Filed Feb. 2, 1967  Sheet 1 of 2

INVENTOR
AKIRA MIZUNO

BY  Paul M. Craig, Jr.
ATTORNEY

United States Patent Office 3,434,575
Patented Mar. 25, 1969

3,434,575
MOTOR CONTROL AND BRAKE HOLDER
Akira Mizuno, Kariya-shi, Japan, assignor to Goshi Kaisha Mizuno Kogeisha, Kariya-shi, Japan, a corporation of Japan
Filed Feb. 2, 1967, Ser. No. 613,489
Claims priority, application Japan, Nov. 17, 1966, 41/75,638
Int. Cl. F16d 67/00, 23/00; B60t 11/10
U.S. Cl. 192—3                                    4 Claims

ABSTRACT OF THE DISCLOSURE

A braking system for vehicle having a non-return solenoid valve which is opened when energized, travel detecting means, a control circuit for passing a travel signal generated by said travel detecting means to said valve, and an accelerator switch operatively connected to the valve to bring said valve in non-return position during starting of the vehicle.

---

The present invention relates to an improvement in the braking system for automobiles or other vehicles and has for its object the provision of such a braking system which, after being actuated by the operation of the brake pedal during travelling of a vehicle to bring said vehicle to rest, will remain in effect until the accelerator is stepped on again and which, therefore, renders the operating process of the vehicle easy in starting the vehicle, for example, for ascending a slope.

The braking system according to the present invention comprises a non-return solenoid valve disposed between a master cylinder and wheel cylinders in a hydraulic brake system, travel detecting means for detecting the travelling of a vehicle such, for example, as an alternating current signal generator consisting of a rotary magnet and a lead switch, a control circuit provided across said travel detecting means and said non-return solenoid valve through which a travel signal of the vehicle generated by said travel detecting means is transmitted to said non-return solenoid valve to temporarily place the latter in a position in which a brake oil is allowed to flow therethrough in both directions, and an accelerator switch operatively connected to said non-return solenoid valve for placing said valve in the non-return position.

In order that the present invention may be more clearly understood and readily carried into effect, reference may now be had to the accompanying drawings in which the present invention is illustrated as applied to an automobile and in which.

Figure 1:
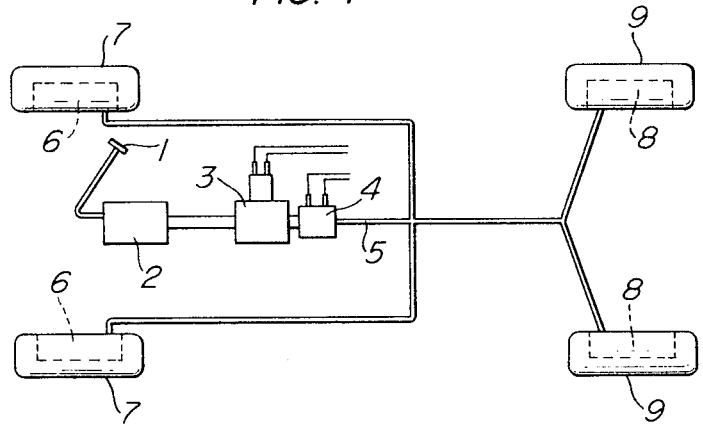
FIGURE 1 is a diagram showing the hydraulic circuit of the braking system according to the present invention.

Referring first to FIG. 1, reference numeral 1 indicates a brake pedal and 2 indicates a master cylinder. A non-return solenoid valve 3 is adapted to operate in such a manner that it allows a brake oil to flow therethrough in both directions when it is excited by a current conducted therethrough but it allows the brake oil to flow therethrough unidirectionally from the master cylinder 2 to the wheel cylinders of respective wheels when it is not excited. A hydraulic switch 4 is provided intermediate a hydraulic pipe 5 communicating said non-return solenoid valve 3 with the wheel cylinder of each wheel, and comprises an electric contact which is adapted to be closed when the pressure in the hydraulic pipe 5 has risen to a level above a predetermined value upon stepping on the brake pedal 1. Reference numerals 6 and 7 represent a wheel cylinder and a brake lining of the front wheels respectively, while reference numerals 8 and 9 represent a wheel cylinder and a brake lining of the rear wheels respectively.

With the arrangement described above, when the brake pedal 1 is stepped on with the solenoid in the non-return valve 3 unexcited, the brake oil in the master cylinder 2 flows through the hydraulic pipe 5 under pressure, applying a brake to the wheels. In this case, since the non-return solenoid valve 3 is unexcited, the brake oil is allowed to flow only in one direction and the pressure of the brake oil in the wheel cylinders 6 and 8 therefore, is maintained at the elevated level, even after the stepping force is removed from the brake pedal. Thus, the wheels are continuously held in the brake condition automatically. Upon conducting a current through the non-return solenoid valve 3, the valve is made open in both directions permitting the brake oil in the hydraulic pipe 5 to flow back into the master cylinder 2 and thus the wheels are released from the braked condition.

Figure 2:
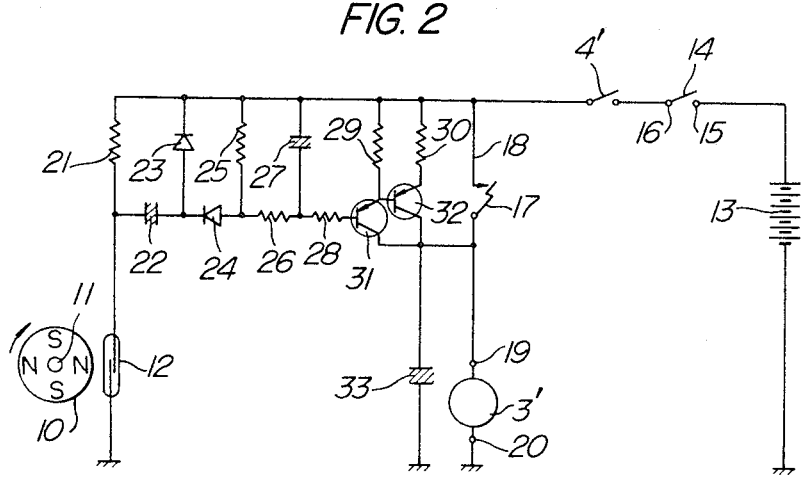
FIGURE 2 is a wiring diagram showing the electric circuit to control the hydraulic circuit shown in FIGURE 1.
Figure 3:
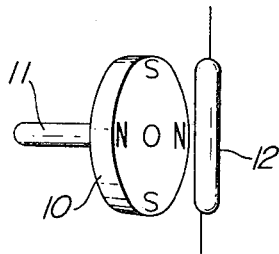
FIGURE 3 is a perspective view of travel detecting means for detecting the travelling of a vehicle.

Referring next to FIG. 2 in which the electric circuit to control the hydraulic circuit is illustrated by way of example, a permanent magnet 10 is magnetized to have four poles as shown and is mounted on a rotary shaft 11. The rotary shaft 11 is operatively associated with a flexible shaft which drives a speedometer of the automobile, so that it is rotated at a rate proportional to the speed of the automobile. Arranged adjacent the rotatable permanent magnet 10 is a so-called lead switch 12 which is composed of a glass tube and two flexible strips disposed in said glass tube in opposed relation so as to form an electric contact, said flexible strips being made of a magnetic material. It will be understood that the lead switch 12 is opened and closed repeatedly as the permanent magnet 10 rotates. Alternatively, repeated interruption of the current may be obtained by the contact of equally spaced four contacts arranged peripherally of a rotor with a brush, instead of the means shown consisting of the magnet 10 and lead switch 12. A battery 13 has its negative pole ground, while the positive pole thereof is connected to a terminal 15 of a power switch 14. The power switch 14 has the other terminal 16 connected to a terminal 18 of an accelerator switch 17 through a contact 4' of the hydraulic switch 4 shown in FIG. 1, which accelerator switch is operatively connected to the accelerator. The other terminal of the accelerator switch 17 is connected to a terminal 19 of the solenoid 3' in the non-return solenoid valve 3 shown in FIG. 1 and the other terminal 20 of said solenoid 3' is grounded.

A terminal of the contact 4' of the hydraulic switch 4 is further connected to a terminal of the lead switch 12 through a resistance 21 and the other terminal of the lead switch 12 is grounded. The control circuit, as seen in FIG. 2, is composed of a condenser 22, diodes 23 and 24, resistances 25 and 26, condenser 27, resistances 28, 29 and 30, transistors 31 and 32, and condenser 33. The accelerator switch 17, which is normally open, is so operatively connected to the accelerator mechanism of the automobile that it is closed when the accelerator is stepped on. Instead of the arrangement described above in which the accelerator switch is operatively connected to the accelerator mechanism, the same purpose may be attained by such an arrangement in which a microswitch is actuated by the movement of a pressure sensing diaphragm provided in association with the suction manifold of the engine and adapted to sense a negative pressure developed in said suction manifold. With such arrangement, the microswitch is also closed upon actuation of the accelerator by an increasing suction negative pressure developed in the engine.

Figure 4A:
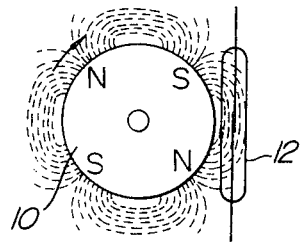
FIGURES 4(A), 4(B) and 4(C) illustrate the operation of the travel detecting means.
Figure 4B:
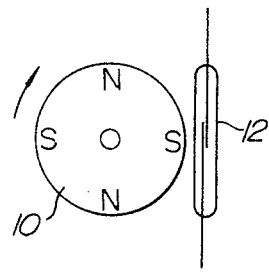
Figure 4C:
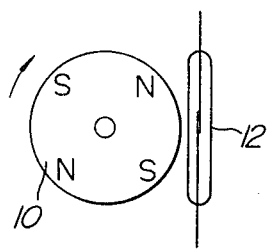

The magnet 10 is rotated during travelling of the automobile and the lead switch 12 is opened and closed accordingly as will be seen in FIG. 4. At the rotational angular position of the magnet 10 shown in FIG. 4(A), part of the line of magnetic force produced by the magnetic poles of the magnet forms a closed circuit crossing the two leads enclosed in the lead switch 12 as indicated by the dotted lines, so that the lead switch 12 is closed by said magnetic force. Upon turning of the magnet 10 to the angular position shown in FIG. 4(B), the polarities of the movable ends of the two leads become the same due to magnetic induction, with the result that the leads repulse each other bringing the switch into open position. When the magnet 10 turns further to the position shown in FIG. 4(C), the lead switch 12 is closed again. Thus, it will be appreciated that the lead switch is closed four times during one full turn of the magnet 10, although the distribution of the line of magnetic force of the magnet is not shown in FIGS. 4(B) and 4(C).

The power switch 14 shown in FIG. 2 simultaneously serves as an ignition switch of the automobile. When the engine is started with the switch 14 closed and the automobile starts travelling, the magnet 10 also begins to rotate causing the lead switch 12 to open and close repeatedly. Upon stepping on the brake pedal in this state to close the contact 4' of the hydraulic switch, the current flowing through the resistance 21 is interrupted repeatedly and therefore an alternating current is produced across both terminals of said resistance due to voltage drop. The alternating current is then converted into direct current by being rectified by the diodes 23 and 24 while it flows through said diodes after passing through the coupling condenser 22. The resultant direct current is further applied through a smoothing circuit, consisting of the condenser 27 and resistances 25, 26 and 28, to have all ripple components removed therefrom and, after being amplified by a current amplifier consisting of the transistor 31 and the resistance 29, it is fed into a power amplifier consisting of the transistor 32 and resistance 30. As seen in the figure, the emitter collector circuit of the transistor 32 is connected to the solenoid 3' of the non-return solenoid valve in series and also connected to the accelerator switch 17 in parallel. The condenser 33 is connected to the solenoid 3' in parallel so as to avoid damage of the transistor possibly caused by an induction voltage which will be produced upon interruption of the current to the solenoid 3'.

When brake pedal is stepped on during travelling of the automobile, the brake oil is supplied to the wheel cylinder of each wheel through the hydraulic pipe 5, thereby applying a brake to the respective wheels. At the same time, the contact 4' of the hydraulic switch 4 is closed, whereupon a power is supplied to the transistor circuit shown in FIG. 2, causing the lead switch 12 to be opened and closed in the manner described previously. After all, the transistor 32 is brought into conductive state and permits the current to flow through the solenoid 3' to excite the same. The non-return solenoid valve 3, therefore, is brought into open position and, when the pressure is removed from the accelerator during travelling of the automobile, the brake oil is allowed to flow back into the master cylinder 2 through the hydraulic pipe 5, thus removing the brake force from the wheels. As will be understood from the above, the braking action obtained by operating the inventive braking system during travelling of the automobile is the same as that obtained from conventional braking systems. According to the present invention, however, when a force is exerted on the brake pedal 1 during travelling and is continuously applied to said brake pedal until the automobile is finally brought to halt, the opening and closing action of the lead switch 12 stops coincidentally with the stoppage of the automobile, as a result of which the transistor 32 becomes non-conductive and the solenoid 3' is thus released from excitation. The valve 3, therefore, is placed in a non-return position to keep the hydraulic pressure in the wheel cylinder of each wheel at the elevated level, which means that the wheels are retained in the braked condition.

In starting the automobile again, a force is applied to the accelerator pedal, in which case the application of even a slight force causes the accelerator switch 17 to be closed and thereby a current is allowed to flow from the battery 13 to the solenoid 3' through the switch 14, contact 4' and switch 17. The non-return solenoid valve 3, therefore, is brought into open position providing for the flow of the brake oil in both directions and thus the wheels are released from the braked condition automatically.

As has been described hereinabove, the inventive braking system operates in the same manner as conventional ones during travelling of a vehicle, enables the braked condition to be retained automatically even after the vehicle is brought to rest and, when the vehicle is started by stepping on the accelerator, it enables the braked condition to be released automatically. Such features of the invention not only eases the process of the vehicle for ascending a slope but also eliminates the need for continuous application of a pressure to the brake pedal for that period of time when the vehicle is stopped temporarily at an intersection or other occasions and thereby eliminates the danger of the vehicle advancing inadvertently by being knocked by another vehicle from behind. Moreover, according to the present invention, since the wheels are held in the braked condition positively when the vehicle is held stationary, by only stepping on the brake pedal for a short period, the inventive braking system will markedly enhance the safety of the vehicle in a stationary state in combination with the effect of a hand brake.

What is claimed is:
1. In a braking system for vehicles, such as automobiles having an accelerator for controlling the speed thereof, including a master cylinder connected to individual wheel cylinders for selectively providing hydraulic fluid thereto, the improvement comprising
a solenoid valve connected between said master cylinder and at least one of said wheel cylinders, said solenoid valve having an energized state wherein fluid may pass therethrough between said master cylinder and said wheel cylinder in both directions and a deenergized state wherein fluid may pass therethrough only in the direction from said master cylinder to said wheel cylinder,
travel detecting means for generating a signal only in response to movement of said vehicle,
control means connecting said travel detecting means to said solenoid valve for energizing said valve during movement of said vehicle thereby providing fluid flow therethrough in both directions, and
a starting circuit including an accelerator switch, a pressure switch and a voltage source connected electrically in series to said solenoid valve for energizing said solenoid valve at the start of the vehicle, said accelerator switch being closed upon actuation of said accelerator and said pressure switch being closed by a predetermined fluid pressure between said master cylinder and said wheel cylinder.

2. The combination defined in claim 1 wherein said solenoid valve is connected between said master cylinder and all of said wheel cylinders.

3. The combination defined in claim 1 wherein said travel detecting means includes an intermittent switch connected to said voltage source and actuating means responsive to the speed of said vehicle for repetitively closing said intermittent switch at a speed proportional to the speed of said vehicle.

4. The combination defined in claim 1 wherein said control means includes transistor amplifier means for detecting and amplifying the signal generated by said travel detecting means.

References Cited

UNITED STATES PATENTS

| | | | |
|---|---|---|---|
| 2,573,196 | 10/1951 | Harmon | 192—3 |
| 2,583,485 | 1/1952 | Harmon et al. | 192—3 |
| 2,630,195 | 3/1953 | Weiss et al. | 192—3 |
| 2,630,196 | 3/1953 | Weiss et al. | 192—3 |
| 2,826,284 | 3/1958 | Price | 192—3 |
| 2,902,119 | 9/1959 | Gates | 192—3 XR |

BENJAMIN W. WYCHE III, *Primary Examiner.*

U.S. Cl. X.R.

188—152